United States Patent
Yu et al.

(10) Patent No.: US 9,257,021 B2
(45) Date of Patent: *Feb. 9, 2016

(54) SYSTEMS AND METHODS FOR OPTICALLY INDUCED CUTANEOUS SENSATION

(71) Applicant: Pine Development Corporation, Mountain View, CA (US)

(72) Inventors: William J. Yu, Mountain View, CA (US); Alexander A. Brownell, Bountiful, UT (US)

(73) Assignee: PINE DEVELOPMENT CORPORATION, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,743

(22) Filed: Nov. 6, 2013

(65) Prior Publication Data

US 2014/0306812 A1 Oct. 16, 2014

Related U.S. Application Data

(60) Provisional application No. 61/811,552, filed on Apr. 12, 2013, provisional application No. 61/842,175, filed on Jul. 2, 2013, provisional application No. 61/887,861, filed on Oct. 7, 2013.

(51) Int. Cl.
*H04B 3/36* (2006.01)
*G06F 3/033* (2013.01)
(Continued)

(52) U.S. Cl.
CPC *G08B 6/00* (2013.01); *G06F 3/011* (2013.01); *G06F 3/016* (2013.01); *G06F 3/0488* (2013.01); *G06F 3/0416* (2013.01)

(58) Field of Classification Search
CPC .......... G08B 6/00; G06F 3/016; G06F 3/0414; G06F 3/0416; G06F 3/0488; G06F 21/32; G06F 2203/04106; G09B 21/003; A61N 2005/0643; A61N 5/06; A61N 2005/0644; A61N 2005/0659
USPC ............ 340/407.1, 407.2; 345/173, 156, 165; 607/88, 89, 100, 2, 148
See application file for complete search history.

(56) References Cited

U.S. PATENT DOCUMENTS

| 6,038,595 A | 3/2000 | Ortony |
|---|---|---|
| 7,488,341 B2 | 2/2009 | Merfeld |

(Continued)

OTHER PUBLICATIONS

Cayce, Infrared Neural Stimulation of Thalamocortical Brain Slices, IEEE Journal of Selected Topics in Quantum Electronics, vol. 16, No. 3, May/Jun. 2010, 8pgs.

(Continued)

*Primary Examiner* — Mirza Alam
(74) *Attorney, Agent, or Firm* — Phillips Ryther & Winchester; Jared L. Cherry

(57) ABSTRACT

The present disclosure relates to systems and methods for inducing a cutaneous sensation in a user of an electronic device. Such systems and methods may include a stimulation system configured to generate an output operable to excite neural tissue. An interface component may be configured to direct the output of the stimulation system onto a target area of skin of the user, and a controller may be configured to generate a control signal to cause the stimulation system to modify one or more characteristics of the output of the stimulation system in order to induce a cutaneous sensation. The cutaneous sensation may be based on a tactile application executable on the electronic device that is configured to generate a representation of a simulated object. Further, a stimulation profile may represent at least one present stimulation area and at least one prior stimulation area.

24 Claims, 15 Drawing Sheets

(51) Int. Cl.
*G06F 3/041* (2006.01)
*A61F 2/00* (2006.01)
*G08B 6/00* (2006.01)
*G06F 3/01* (2006.01)
*G06F 3/0488* (2013.01)

(56) References Cited

U.S. PATENT DOCUMENTS

| | | | |
|---|---|---|---|
| 7,736,382 B2 | 6/2010 | Webb et al. | |
| 7,833,257 B2 | 11/2010 | Walsh, Jr. et al. | |
| 7,883,535 B2 | 2/2011 | Cantin et al. | |
| 7,883,536 B1 | 2/2011 | Bendett et al. | |
| 7,951,181 B2 | 5/2011 | Mahadevan-Jansen et al. | |
| 7,988,688 B2 * | 8/2011 | Webb | A61N 5/0618 128/898 |
| 7,994,468 B2 | 8/2011 | Duijve et al. | |
| 8,012,189 B1 | 9/2011 | Webb et al. | |
| 8,160,696 B2 | 4/2012 | Bendett et al. | |
| 8,330,729 B2 | 12/2012 | Tachi et al. | |
| 8,456,448 B2 | 6/2013 | Rekimoto | |
| 8,562,658 B2 | 10/2013 | Shoham et al. | |
| 8,574,280 B2 | 11/2013 | Yu et al. | |
| 2002/0002391 A1 | 1/2002 | Gerdes | |
| 2005/0052428 A1* | 3/2005 | Hayashi et al. | 345/173 |
| 2006/0046031 A1* | 3/2006 | Janevski | 428/195.1 |
| 2006/0154216 A1 | 7/2006 | Hafez et al. | |
| 2007/0060984 A1 | 3/2007 | Webb et al. | |
| 2007/0179534 A1 | 8/2007 | Firlik et al. | |
| 2007/0285402 A1* | 12/2007 | Lim | G06F 3/016 345/173 |
| 2008/0077200 A1 | 3/2008 | Bendett et al. | |
| 2009/0069871 A1 | 3/2009 | Mahadevan-Jansen et al. | |
| 2009/0174671 A1* | 7/2009 | Tachi | G06F 3/016 345/173 |
| 2009/0278798 A1* | 11/2009 | Kim | G06F 3/011 345/158 |
| 2010/0152794 A1* | 6/2010 | Radivojevic et al. | 607/2 |
| 2010/0262212 A1 | 10/2010 | Shoham et al. | |
| 2010/0292758 A1 | 11/2010 | Lee et al. | |
| 2011/0238141 A1 | 9/2011 | Webb et al. | |
| 2011/0295331 A1 | 12/2011 | Wells et al. | |
| 2012/0068952 A1* | 3/2012 | Slaby | G01K 7/02 345/173 |
| 2012/0147911 A1 | 6/2012 | Dantus et al. | |
| 2012/0179228 A1 | 7/2012 | DeCharms | |
| 2012/0302821 A1 | 11/2012 | Burnett | |

OTHER PUBLICATIONS

Jindra, Epidermal laser stimulation of action potential in the frog sciatic nerve, Journal of Biomedical Optics 15(1), 015002-1-15002-6, Jan./Feb. 2010, 6pgs.
L'Etang, The effect of Laser Wavelength in the Simulation of Laser Generated Surface Waves in Human Skin Model, Proceedings of the 28th IEEE, EMBS Annual International conference, NY, USA, Aug. 30-Sep. 3, 2006, 4pgs.
Stockbridge, Focusing through dynamic scattering media, Optics Express 15087, vol. 20, No. 14, Jul. 2, 2012, 7 pgs.
Wells, Application of infrared light for in vivo neural stimulation, Journal of Biomedical Optics 10(6), 064003-1-064003-12, Nov./Dec. 2005, 12pgs.
Wells, Optical Stimulation of neural tissue in vivo, Optics Letters, vol. 30, No. 5, p. 504-506, Mar. 1, 2005, 3pgs.
Wells, Optically Mediated Nerve Stimulation: Identification of Injury Thresholds, Wiley InterScience, Lasers in Surgery and Medicine 39:513-526, Jul. 23, 2007, 14pgs.
International Search Report of PCT/US2013/049141, Dec. 3, 2013.
Written Opinion of PCT/US2013/049141, Dec. 3, 2013.
Wells, et al. Infrared nerve stimulation: Hearing by light. BioOptics World, Nov. 1, 2008.
Himmer, et al. Micromachined silicon nitride deformable mirrors for focus control, Optics letters, vol. 26, No. 16, Aug. 15, 2001.
Shao, 3-D Moems Mirror for Laser Beam Pointing and Focus Control, IEEE Journal of Selected Topics in Quantum Electronics, vol. 10, No. 3, May/Jun. 2004.

* cited by examiner

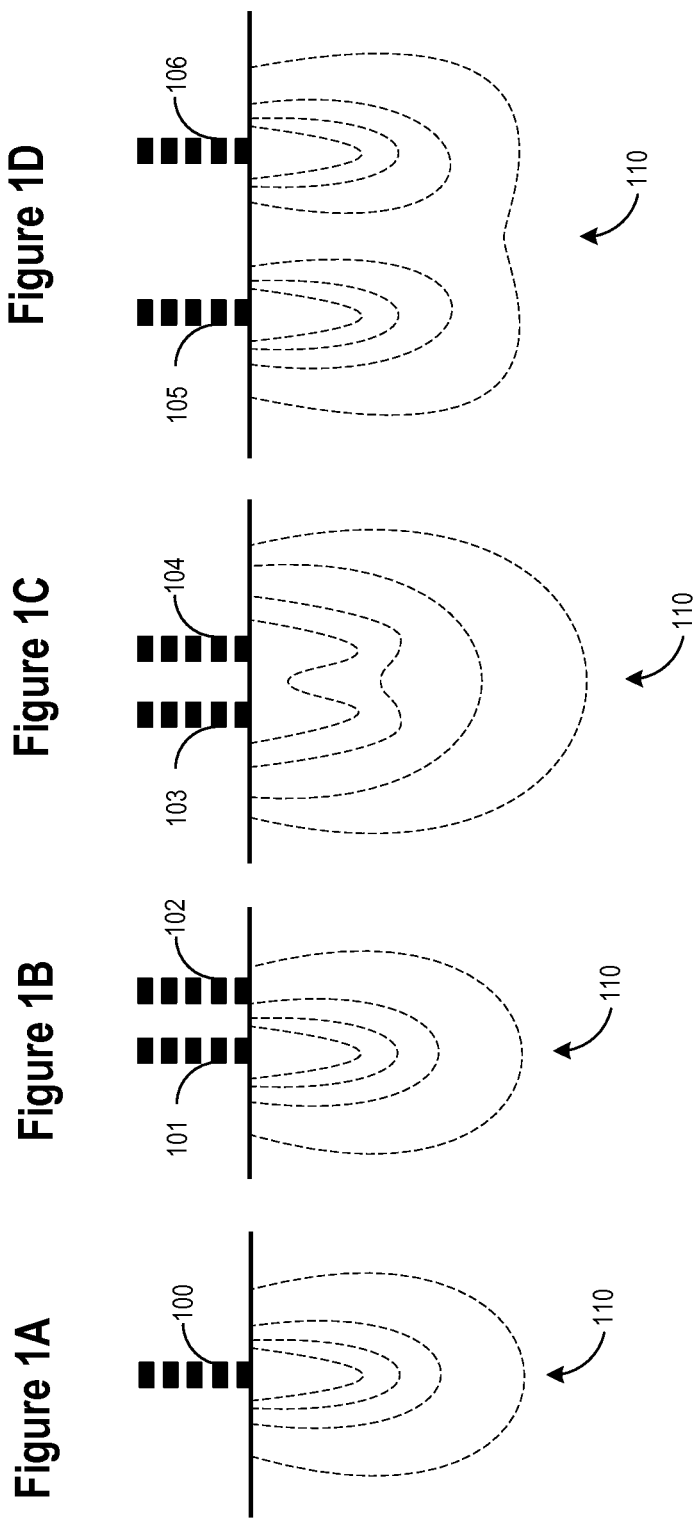

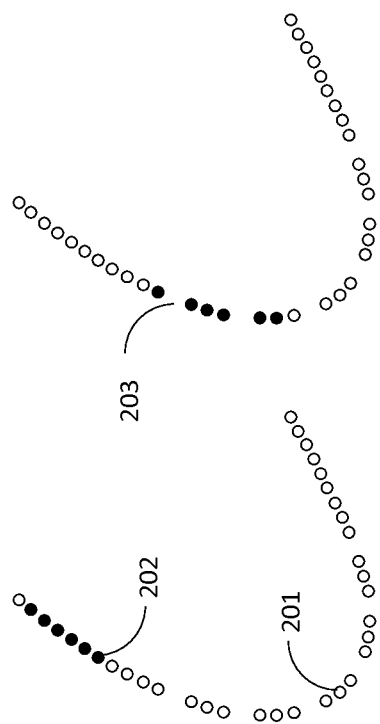
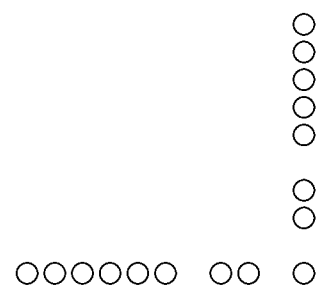
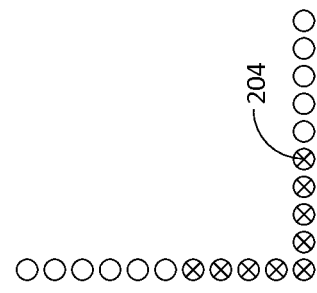
Figure 2A  Figure 2B  Figure 2C  Figure 2D

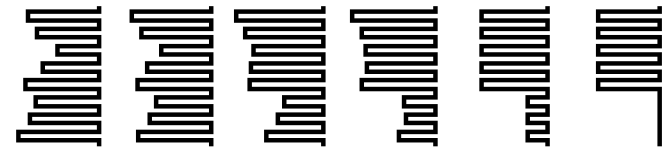
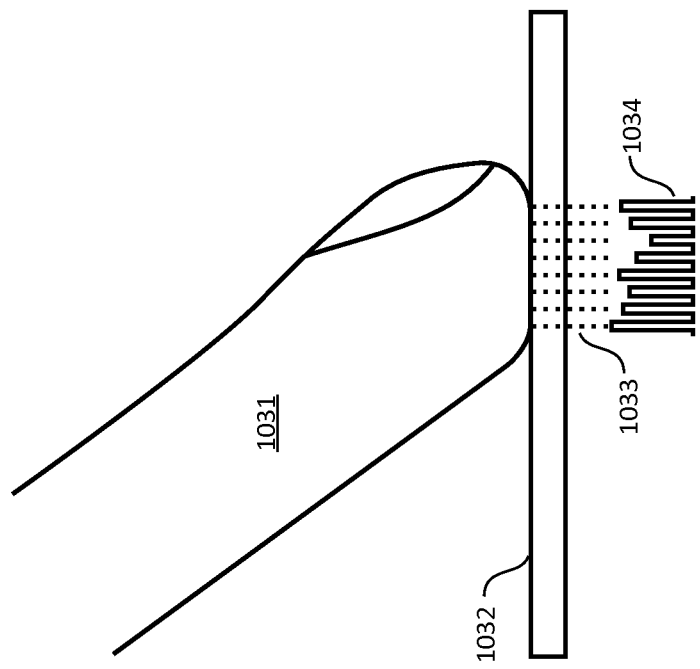

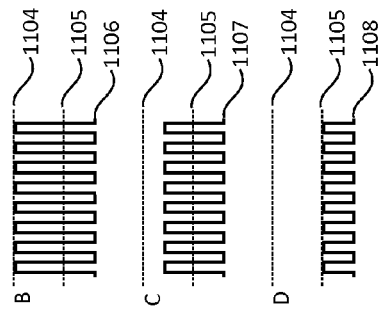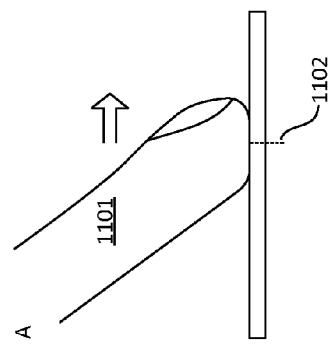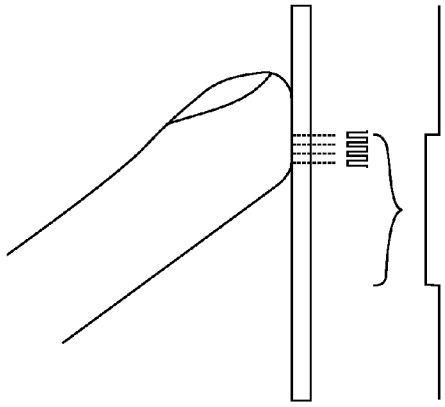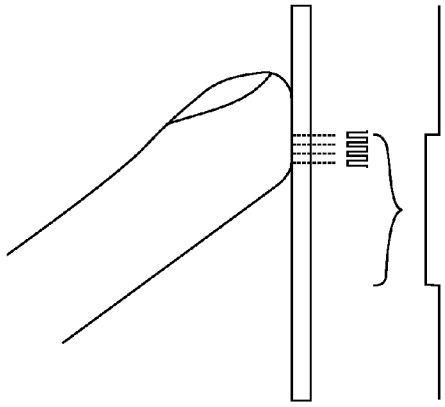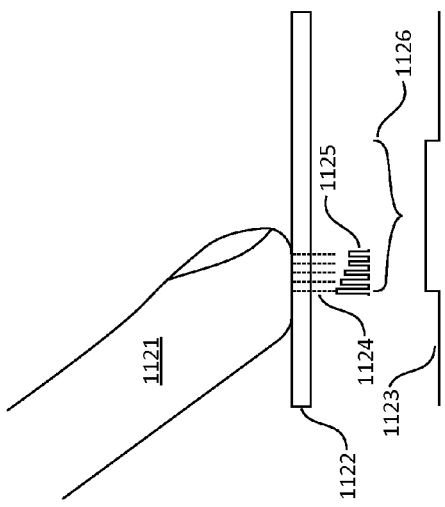
Figure 11A
Figure 11B
Figure 11C
Figure 11D
Figure 11E
Figure 11F
Figure 11G

SYSTEMS AND METHODS FOR OPTICALLY INDUCED CUTANEOUS SENSATION

RELATED APPLICATIONS

The present application claims the benefit under 35 U.S.C. §119(e) of U.S. Provisional Patent Application No. 61/811,552, filed Apr. 12, 2013, and titled "Algorithms and Hardware for Control of Light Induced Cutaneous Sensation," which is incorporated herein by reference in its entirety; of U.S. Provisional Patent Application No. 61/842,175, filed Jul. 2, 2013, and titled "Non-Contact Interface," which is incorporated herein by reference in its entirety; and of U.S. Provisional Patent Application No. 61/887,861, filed Oct. 7, 2013, and titled "Non-Contact Interface," which is incorporated herein by reference in its entirety.

TECHNICAL FIELD

Presently disclosed are systems and methods related to the stimulation of sensation either directly or indirectly using directed electromagnetic radiation.

BRIEF SUMMARY

Electromagnetic radiation directed onto the superficial tissue of a user may induce sensations similar to that of a mechanical stimulus. In some embodiments, electromagnetic radiation may also induce heating sensations. The use of these energies directed at the tissue of a user may be used to convey many types of information to the user, such as, but not limited to, the size, shape, compliance, temperature, and texture of an object, text, warnings, directional commands or feedback, and movement.

The techniques and systems described herein are generally applicable to infrared and visible spectrum stimuli in both contact surface stimulation embodiments and free-space (i.e., non-contact) stimulation embodiments. The various embodiments may include a controller that directs the energy from a single source or multiple illumination sources through optics onto a user's tissue in such a way that sensations are induced.

BRIEF DESCRIPTION OF DRAWINGS

FIG. 1A illustrates a conceptual representation of a stable temperature field at equilibrium of a constant beam of optical stimulation consistent with embodiments of the present disclosure.

FIG. 1B illustrates a steady stimulation with a temperature field at equilibrium with the later instantaneous addition of second stimulus within the temperature field of the first beam before any heating due to energy deposition of the second stimulus consistent with embodiments of the present disclosure.

FIG. 1C illustrates an approximate steady state condition of two incident beams that are sufficiently proximate for their temperature field overlap and combine consistent with embodiments of the present disclosure.

FIG. 1D illustrates an example where two stimulating beams whose temperature fields have minor overlap consistent with embodiments of the present disclosure.

FIG. 2A illustrates a stimulation profile including a curve at a first time consistent with embodiments of the present disclosure.

FIG. 2B illustrates the stimulation profile of FIG. 2A at a second time and shows modification of the stimulation protocol to reduce stimulation in areas where the curvature may cause intensified stimulation consistent with embodiments of the present disclosure.

FIG. 2C illustrates a stimulation profile including a corner and variable spacing of stimulation points.

FIG. 2D illustrates an alternative to the stimulation profile of FIG. 2C in which the stimulation points are spaced evenly and in which the intensity of the stimulation is varied to achieve consistent stimulation near the corner consistent with embodiments of the present disclosure.

FIG. 10A illustrates a conceptual representation of a system configured to create variable cutaneous sensations associated with stationary tissue consistent with embodiments of the present disclosure.

FIG. 10B illustrates that over time, the stimulation profile shown in FIG. 13A and representing a topography of a simulated object, changes beneath the finger consistent with embodiments of the present disclosure.

FIG. 11A illustrates a conceptual representation of a system configured to create a cutaneous sensation by varying a stimulation amplitude at a fixed location while a finger moves across the fixed location consistent with embodiments of the present disclosure.

FIGS. 11B-11D illustrate three stimulation profiles that represent a topography of a simulated object based on a speed of the finger as it moves across the point of stimulation illustrated in FIG. 11A consistent with embodiments of the present disclosure.

FIGS. 11E-11G further illustrate that an amplitude of a stimulation profile may vary as a result of a topography of a simulated object consistent with embodiments of the present disclosure.

DETAILED DESCRIPTION

Figure 3:
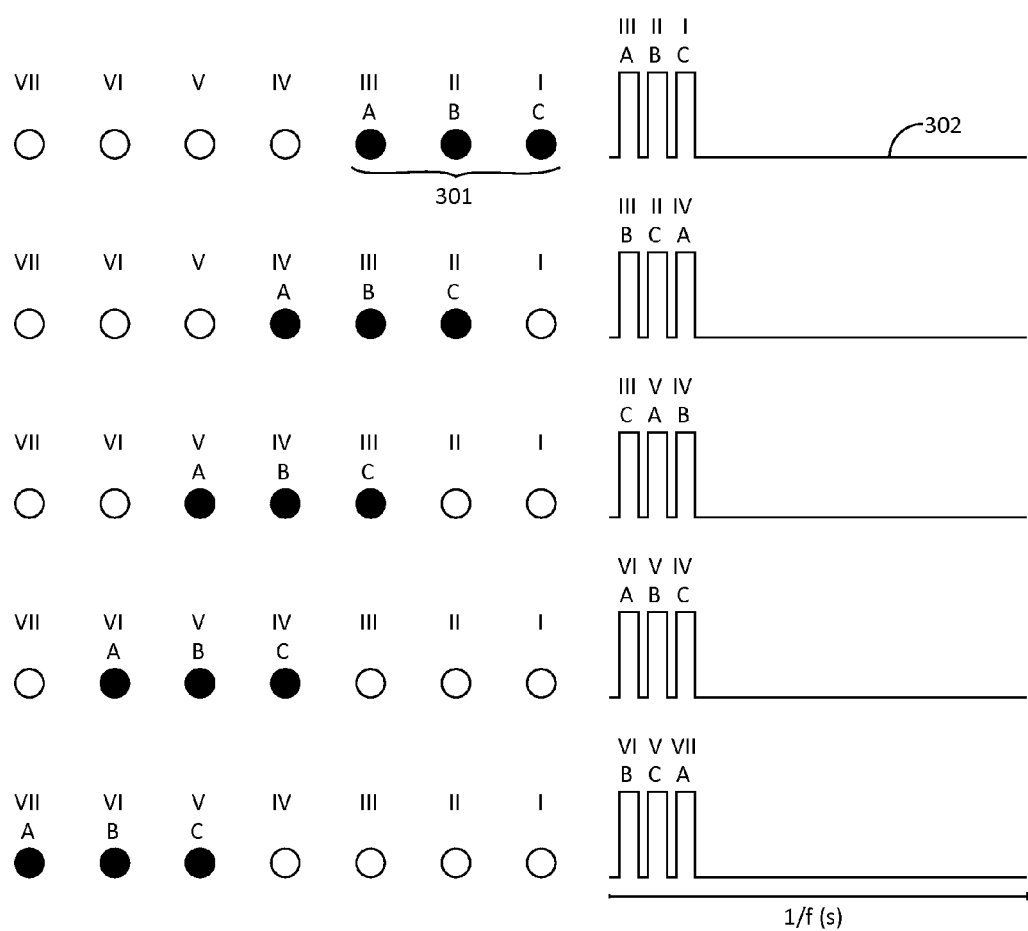
FIG. 3 illustrates a representation of a system configured to rearrange an order of stimulation to achieve a steady frequency of stimulation of each of a plurality of points in a moving array of stimuli consistent with embodiments of the present disclosure.

Incident stimulation on the tissue, depending on the wavelength, may raise the temperature of the tissue. The initial tissue temperature may affect the stimulation threshold. In general, as the initial tissue temperature increases, the stimulation threshold to induce sensation decreases. Due to thermal conductivity and heat capacity of the tissue as well as contribution from blood flow, to name a few variables, the heat introduced to the tissue at the stimulation site spreads into the tissue surrounding that stimulation site. In the case of a single point of sustained stimulation, such that the stimulation is a repeating pulse or a sustained constant illumination, the tissue temperature just before the beginning of the stimulation may be nearly uniform with that of the immediately surrounding tissue. During the initial moments of stimulation heat at the site of stimulation may be concentrated in the area immediately adjacent to the stimulation. Over time, heat at the stimulation site may conduct radially to the surrounding tissues as well as axially. The tissue surface poses a boundary to conduction.

Heat loss due to evaporative cooling, convection at the tissue surface as well as radiative losses may dissipate heating from stimulation. The spread of heat from stimulation may affect other sites of potential stimulation. If there is a second point of stimulation within the temperature field of the first stimulation point, then the sensation threshold of the second may be lower. The stimulation threshold may also eventually be decreased even if the second stimulation point is outside the heated tissue of the first. This may happen if the two temperature fields overlap, then the heat dissipation will decrease for each field and the temperature may increase at each stimulation point. As the number of stimulation sites increases, the complexity of the interaction increases. In tight groupings, many stimulation sites may each require less energy than a single site that is stimulated alone would. Taking these interactions into account, a controller of a stimulation system may use intensity of stimulation, duration of previous stimulation, proximity of other stimulation sites, thermal conductivity, heat capacity of the tissue, among other variables, to modulate a stimulation profile. In another embodiment, temperature readings taken from the tissue surface using, such as, but not limited to, an infrared thermographic imager or array or pyrometer, can be used to estimate the subsurface temperature distribution to determine the appropriate stimulation parameters to decrease, maintain, or increase intensity of sensations. Each of these variables may help predict the appropriate adjustment in the stimulation energy to deliver at the various sites.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus, and/or a wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic and/or processor executable instructions.

FIGS. 1A-1D show a plurality of conceptual representations of exemplary incident beams of stimulation from above the tissue and isothermal lines 110, which are illustrated as dashed lines, representing the temperature fields within the tissue. FIG. 1A illustrates an example of a stable temperature field at equilibrium of a constant beam of optical stimulation 100. The increased temperature is highest at the center of the field directly beneath the stimulation and the temperature decreases around that point. FIG. 1B illustrates a steady stimulation with a temperature field at equilibrium 101 with the later addition of a second stimulus 102 that is incident on tissue within the heated tissue temperature field of the first beam 101, but has not yet resulted in significant heat transfer to the tissue. The second stimulus 102 may require less energy to create an additional sensation because the tissue temperature has been raised by the first stimulus 101.

FIG. 1C illustrates a conceptual representation of a steady state condition of two incident beams 103 and 104 that are close enough together for their individual temperature fields to overlap and combine. The combined effect of the two incident beams may reduce the energy required for each beam to induce a sensation.

FIG. 1D illustrates an example where two stimulating beams 105 and 106 are relatively far apart, but there is some minor overlap and joining of the two temperature fields. In the illustrated embodiment, the energy used to create two stimulation points may exceed to the amount of energy used to create two points of stimulation shown in FIG. 1C. The introduction of additional stimulating beams in proximity to stimulating beams 105 and 106 may decrease the intensity required of each of the beams to generate a sensation. In other words, multiple stimulating beams illuminating a corresponding number of stimulation points with overlapping temperature fields may utilize less energy than the same number of stimulating beams and stimulation points if the temperature fields do not overlap. There is a distance beyond which there is no longer a measurable effect and each of the stimulation beams requires the same energy regardless of the number of other simultaneous stimuli at or beyond this distance. This distance may represent diameter the diameter of the increase in tissue temperature. The proximity of beams with their resultant interaction becomes increasingly complex when attempting to convey shape and movement. At curves and corners, the heat fields of stimulation sites may overlap more than in straight lines. This increased overlap may lower the sensation threshold. If the stimuli are left at a constant level while the threshold drops, the user may feel the curves and corners of shapes or the change of direction of an object's movement more intensely than the straight portions of an object or the straight movement thereof.

FIGS. 2A-2D show two embodiments of stimulation protocols that are modified based on proximity of stimulation sites. FIG. 2A illustrates a curved path where empty circles 201 represent possible points of stimulation along the predefined path and filled circles 202 represent current points of stimulation. This example shows a train of points following along the path in order. As the path curves, the increased proximity of the stimulation points may cause the sensation to become more intense if the energy of each point of stimulation remains constant. FIG. 2B illustrates a space 203 in the path where one of the points is removed from the stimulation in comparison to FIG. 2A. According to the embodiment illustrated in FIGS. 2A and 2B, every fourth point around the curved portion of the path is removed. The removal of these points may allow for a uniformity of the sensation between the straighter and the curved portions of the path. FIG. 2A illustrates the train of stimuli in the straighter portion of the path. FIG. 2B illustrates the train in the curved portion of the path. In this example, the stimulus train is 6 points of stimulation that span the gaps in the path. In other embodiments, the stimulation algorithm removes stimuli during the time they would have stimulated the gaps in the path. The length of the train may also dynamically change to elicit the desired sensation. In alternative embodiments, different stimulation patterns may be used to elicit a desired stimulation profile. Such stimulation patterns may selectively omit stimulation points, may vary the intensity of stimulation, or implement other techniques for creating a constant sensation, including, but not limited to, pulse width, amplitude, spot size, speed of a train of stimuli, frequency, duty cycle, waveform, and timing individual stimulations are delivered.

FIG. 2C illustrates an example of a corner which may be illuminated or around which a train of stimuli might be directed. Certain stimulation points in that path are removed to even out the sensation. FIG. 2D illustrates another embodiment having the same shape as FIG. 2C may also even out sensation around the corner. The "x" within the hollow circle 204 indicates a site within the path where the stimulation intensity may be lowered to even out the sensation at the corner. These examples are not only applicable to moving stimulation. These same principles apply to stationary objects where curves and corners bring stimulation points closer together in certain areas of the object represented. Increasing the gaps between stimulation sites and lowering the stimulus intensity may even out the sensation throughout the entire shape.

An even level of sensation is not always desirable. There are situations in which intensification of curves and corners is appropriate. There are also situations where the sensation intensity may be raised further in those areas. This may be accomplished by decreasing the spacing between stimulation sites or increasing the intensity of stimulation at desired sites. Other parameters that can be modified, include, but not limited to, pulse width, amplitude, spot size, speed of a train of stimuli, frequency, duty cycle, waveform, and timing individual stimulations are delivered.

FIG. 3 illustrates a progression of an array of moving points 301 following one another down a path. These points move in order ABC following one another down the path in the direction I-VII. The stimulation waveform 302 is repeated at a steady frequency, f, in Hz and is of length 1/f in seconds. If the stimulation waveform 302 were to always stimulate each point in order of ABC, then each time the array of points moved to a new position points B and C would be stimulated again more quickly than these points would be based on a steady frequency. This figure shows that at each point of the path the pulse is in the same position relative to the stimulation waveform 302. For example, position IV is first stimulated by point A in the second line of the figure at the third pulse of the stimulation waveform. In the third line of the figure the position IV is occupied by point B of the train but is still stimulated by the third pulse of the stimulation waveform. In the fourth line position IV is occupied by point C and is still stimulated by the third pulse in the waveform. By ensuring that each physical location is always stimulated during the same portion of the stimulation waveform there is no shift in frequency of stimulation at any point even when the array of points moves.

As with many other stimulation parameters, the frequency of intermittent stimulation at a single point affects the total energy delivered and the intensity of the sensation. Increasing the frequency of intermittent stimulation while leaving all other stimulation parameters the same increases the intensity of the stimulation. Decreasing the frequency also lessens the sensation intensity. In certain embodiments, a controller may be configured to adjust the output of a stimulation system to maintain an even sensation at a plurality of stimulation areas. A steady sensation may be created by maintaining a constant stimulation frequency or by adjusting other parameters to compensate for potential variations.

Figure 4A:
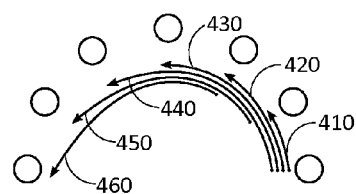
FIG. 4A illustrates a series of points of stimulation that follow one another through a defined path each time the array of points moves to a new position consistent with embodiments of the present disclosure.

FIG. 4A illustrates a series of points of stimulation that follow one another through a defined path each time the array of points moves to a new position the second point occupies the point previously occupied by the first, the third occupies the space of the second and so on. The pattern illustrated in FIG. 4A, which may be referred to herein as "caterpillaring." As shown in FIG. 4A the initial points of a sensory region may be stimulated and then any number of additional points along that path may be added sequentially until the desired length of the "caterpillar" or train of stimulating points is achieved. After the desired "caterpillar" length is achieved the tracing of the intended shape continues and the initial points are dropped as points farther along the path are stimulated.

As shown in FIG. 4A, the initial point of stimulation is on the far right. This point is stimulated, then after a given amount of time the second point is added, as indicated by 410. Now two points are stimulated. A third, fourth and fifth point is eventually added as indicated by 420, 430 and 440 respectively. At this point the caterpillar has reached the desired length and as another point along the path is added to the stimulation the initial point is dropped as shown by 450. 460 shows the progression of the caterpillar to another set of points along the path dropping the first two points of the path. In this example, the length of the caterpillar is 5 points of stimulation. Such a "caterpillar" is not limited to a specific length or number of individual points of stimulation. A train of points of stimulation may trace out any shape and at any speed. Each point of stimulation may be of similar or different stimulation energies as desired to create the effect at different times or physical locations within the shape. The example shown deals with an initial lack of any stimulation and a gradually emerging caterpillar, or growing train of stimulation points. The caterpillar may also emerge at its full length or some intermediate length immediately. The length of the caterpillar may also change dynamically along the path. Many caterpillars may be simultaneously moved around the tissue.

Figure 4B:
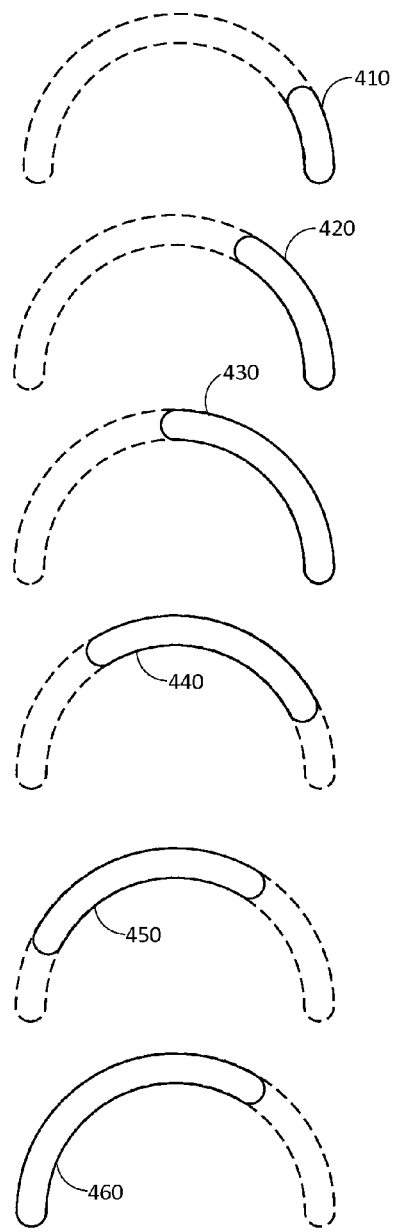
FIG. 4B illustrates a conceptual representation showing movement of the stimulation profile shown in FIG. 4A in which the movement of the stimulation profile is modified to stimulate the same stimulation areas at successive times consistent with embodiments of the present disclosure.

FIG. 4B illustrates a sensation that may be perceived by a user as a result of a "caterpillaring" stimulation pattern at five points of time consistent with one embodiment. The intensity of the leading portions of a caterpillar may be of sufficient intensity to elicit sensation alone, or they may be of lower energy and act to prime the tissue so that later portions of the caterpillar elicit sensation.

FIG. 4B may also represent a separate embodiment in which the illumination pattern is that of a continuously directed beam onto a curved path on the tissue rather than a series of distinct points. Such application of the optical energy may be repeated at a desired frequency in similar manner to the discrete points. The continuous path is not limited to curves, but may represent any shape and is not limited to a single continuous path. The intensity of the stimulation may also vary throughout the path.

If in the stimulation program the array of points are always stimulated in the same order in a cluster at the beginning of each round of stimulation, then there may be increases in the frequency for all stimulation points except for the leading point each time the caterpillar moves to a new position. These increases in frequency may increase the intensity of the stimulation undesirably. Such considerations are applicable to stimulation systems including a single illumination source and to systems including multiple illumination sources. In the case of a system including a single source of illumination, the stimulation pulses are directed onto target tissue via some method of beam steering. Each stimulation cycle may allow time at the initial site for stimulation to reach a threshold, time for the steering mechanism to redirect the beam as appropriate, and time to stimulate the next point, and so on. Each pulse may remain in its place in the stimulation cycle relative to the position of the stimulus site rather than its place in the array of sites or the frequency of stimulation at one or more points may be altered. Certain embodiments consistent with the present disclosure may utilize punctate stimuli to create sensation; however, the present disclosure is also applicable to systems in which a stimulation system utilizes a continuously moving beam.

Figure 5A:
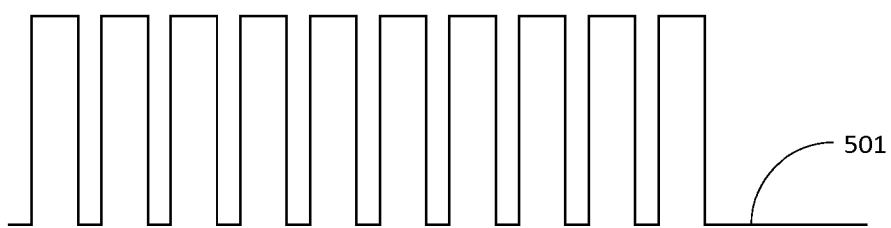
FIGS. 5A-5C show an example of a stimulation pattern over time in which the initial pulses within a stimulation profile are gradually removed until there is a single stimulation point remaining.
Figure 5B:
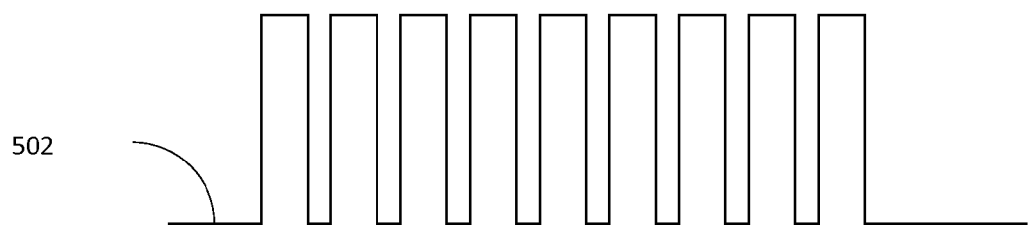
Figure 5C:
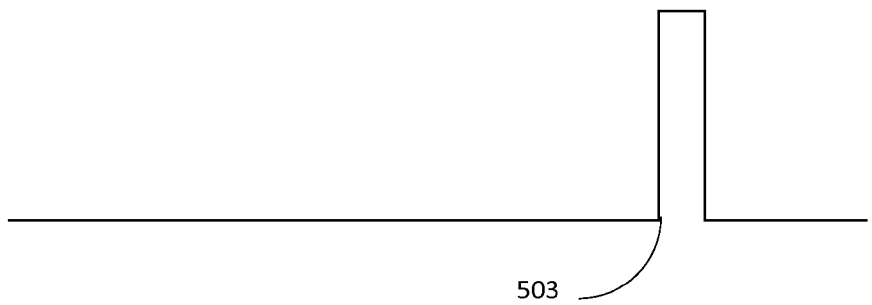

FIGS. 5A-5C show an example of a stimulation pattern over time in which the initial pulses within a stimulation profile are gradually removed until there is a single stimulation point remaining. The exemplary stimulation patterns illustrated in FIGS. 5A-5C demonstrate that in certain embodiments, a steady frequency of stimulation may be maintained when removing stimulation points from a stimulation profile. The gradual or immediate removal of one or more stimulation points from a sensation is one technique that may be used to represent a variety of shapes, objects or movements. FIG. 5A illustrates an initial waveform 501, in which all points of the shape are stimulated. In FIG. 5B the left-most point is taken away, as indicated by 502. In FIG. 5C all points except the right-most point is taken away. As illustrated in FIG. 5C, the temporal position of the right-most pulse 403 may be maintained to keep the stimulation frequency steady. In other embodiments, if frequency of stimulation shifts, other parameters may be modified to stimulate a constant sensation intensity.

When initially encountering an object, a user may have a natural inclination to determine the object's characteristics by touching the object and moving the user's finger or other skin relative to that object in order to gather more information. Movement of any shape across the tissue may be used to mimic the tactile sensation of an object. Movement can be detected at a broad range of speeds. As the shape moves faster, more energy may be used to maintain the same level of sensation. Slower movement may use less stimulation energy for a similar sensation intensity. If a shape moving quickly retraces or recrosses a previously stimulated area, the stimulation intensity may be lessened to preserve equal sensation intensity. Certain embodiments incorporating this feature may create a profile representing a present stimulation and prior stimulation, together with a last time of stimulation associated with each of the plurality of stimulation sites.

For certain shapes and stimulation patterns it may be convenient to use a grid pattern for possible points of stimulation. According to certain embodiments, a grid associated with a stimulation pattern may be laid out such that there are any number of divisions of possible points of stimulation. Cutaneous sensations are subject to a differentiation threshold. If two points of stimulation are closer together than the differentiation threshold, the two separate points of stimulation are not distinguishable as separate points, but rather are experienced as part of a single continuous sensation. Point spacing of stimulated shapes may be fixed or dynamic depending on the application and desired sensation. One method of minimizing energy expended, in order to maximize system efficiency, is to match the spacing of the shape with the spacing of the movement path of that shape. The movement of a shape across the tissue or the movement of the tissue over a stationary stimulated shape may be considered and treated similarly.

Figure 6A:
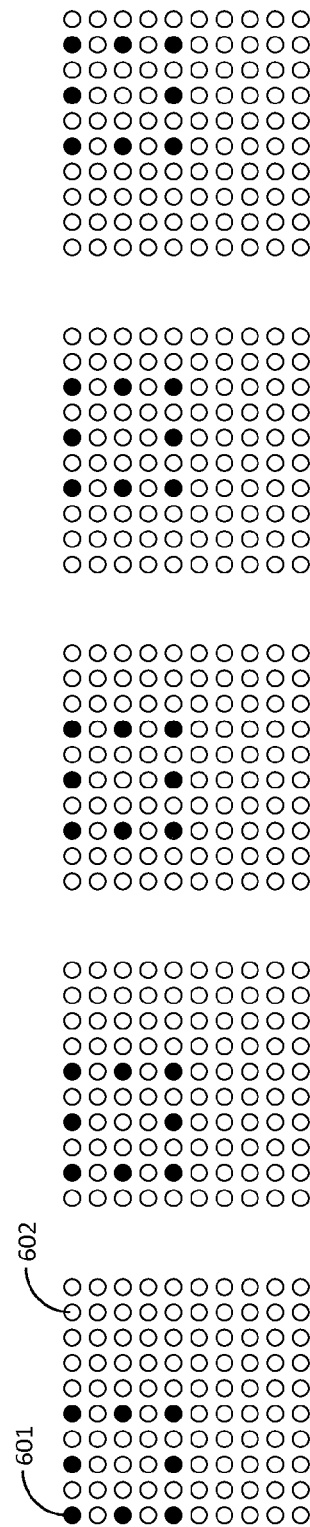
FIG. 6A illustrates a conceptual representation showing movement of a stimulation profile over five time intervals consistent with embodiments of the present disclosure.
Figure 6B:
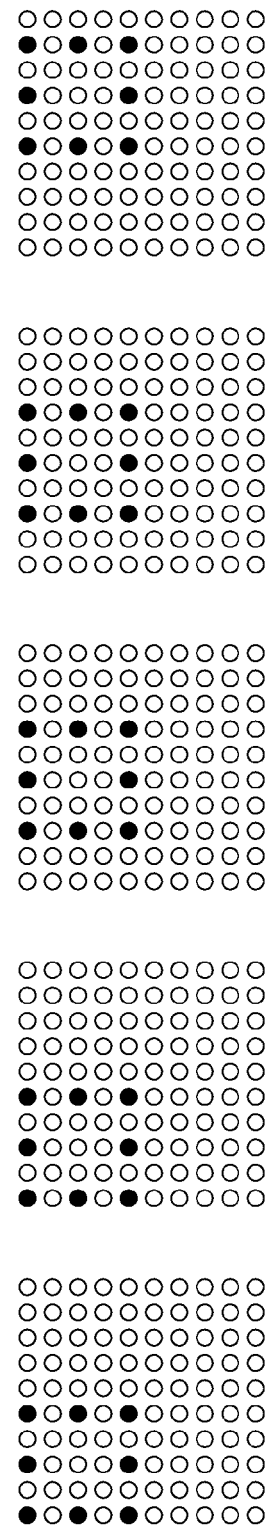
FIG. 6B illustrates a conceptual representation showing movement of the stimulation profile shown in FIG. 6A in which the movement of the stimulation profile is modified to stimulate the same stimulation areas at successive time intervals consistent with embodiments of the present disclosure.

FIGS. 6A and 6B illustrate two exemplary stimulation profiles using a grid system and showing a small hollow square being moved across a field of stimulation from left to right. A filled circle 601 in FIGS. 6A and 6B, represents a point of stimulation, and an empty circle 602, represents a possible point of stimulation in the field. Although FIGS. 6A and 6B depict a grid having an even layout, other embodiments consistent with the present disclosure need not be limited to even intervals. Shapes movements may include, but are not limited to, translations, rotations, inversions, reflections, growth, contractions, or transformations.

The example shown in FIG. 6A uses a spacing of every other possible point for the shape stimulated. In successive frames, moving from left to right, the stimulation in FIG. 6A illustrates that the shape moves to the next set of available points in the grid. FIG. 6B illustrates an example in which the shape moves at the same speed overall as in FIG. 6A: however, in FIG. 6B, at least some of the same stimulation points are used in successive frames. As discussed above, initiating a sensation may utilize more energy than stimulating tissue that has already been stimulated. Accordingly, the example shown in FIG. 6B may utilize less energy to achieve a similar stimulation pattern. This is particularly the case where adjacent points in the grid are separated by a distance that is less than the differentiation threshold. As illustrated in FIG. 6B, there is no movement between the first frame and the second frame, and thus, no new area is stimulated in the transition from the first frame to the second frame. Additionally, in the third frame of FIG. 6B, where the shape moves, four of the points are the same as those previously stimulated while only four points are stimulating previously unstimulated tissue. Again, this approach may reduce the energy used to deliver to those previously stimulated points in order to elicit sensation. The same overall speed can be achieved while reducing energy input to the tissue.

As shown in FIG. 6B simulating movement of a shape may be accomplished by identifying stimulation points in common among a plurality of stimulation frames. As illustrated in FIG. 6B, there are a number of points of stimulation where, when the shape moves, are again stimulated by trailing points within the shape. This allows for less energy expended by the system, but also may allow for a more intense sensation up to a point. In moving a shape it may become difficult for a user to discern movement if the movement is too large. Movement may be more easily discerned when smaller portions of the tissue are dynamically stimulated and allowed to rest. If large portions of the tissue are constantly stimulated it may overwhelm the ability of the user to discriminate the changes at the periphery of the shape.

Creating shape sensations may be accomplished by any number of methods. Shapes of sufficiently small sizes or minimal complexity may be created by fully illuminating the entire shape all at once for a multiple illuminate source system or in a single repeated sweep from a single source system. For more complex or larger shapes, it may be advantageous to use dynamic stimulation. As the term is used herein, dynamic stimulation may refer to a stimulation profile that changes through time and represents a simulated object. Such dynamic changes in stimulation may be accomplished in any number of ways.

Figure 7A:
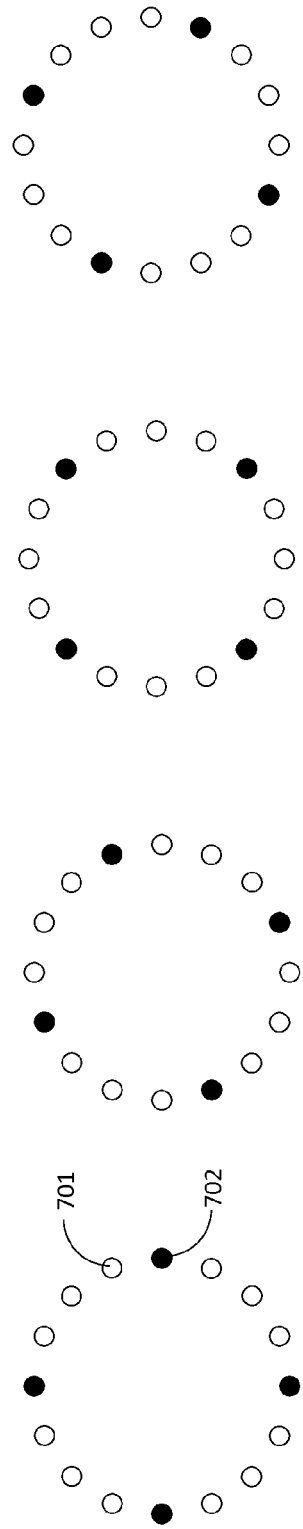
FIG. 7A illustrates a conceptual representation at four time intervals showing dynamic stimulation of a plurality of stimulation points within an object to maintain object perception consistent with embodiments of the present disclosure.

FIG. 7A illustrate one example of a dynamic shape stimulation including four stimulation frames. All small circles represent points of stimulation around the shape. Empty circles 701 represent points of possible stimulation that are not stimulated in the illustrated frame. Filled circles 702 represent points of current stimulation. This example moves in time from the frame at the left to the successive frames at the right. Here a complete circle is represented by only four points in each frame. The movement in time of the limited number of points around the perimeter of the circle allows for the creation of a sensation of the complete shape with fewer points of stimulation. The spacing and the timing of movement may be changed to adjust the sensation. This technique is not limited to the periphery of shapes or any individual shape. This dynamic movement may be applied to many different objects of any shape, size or composition.

Figure 7B:
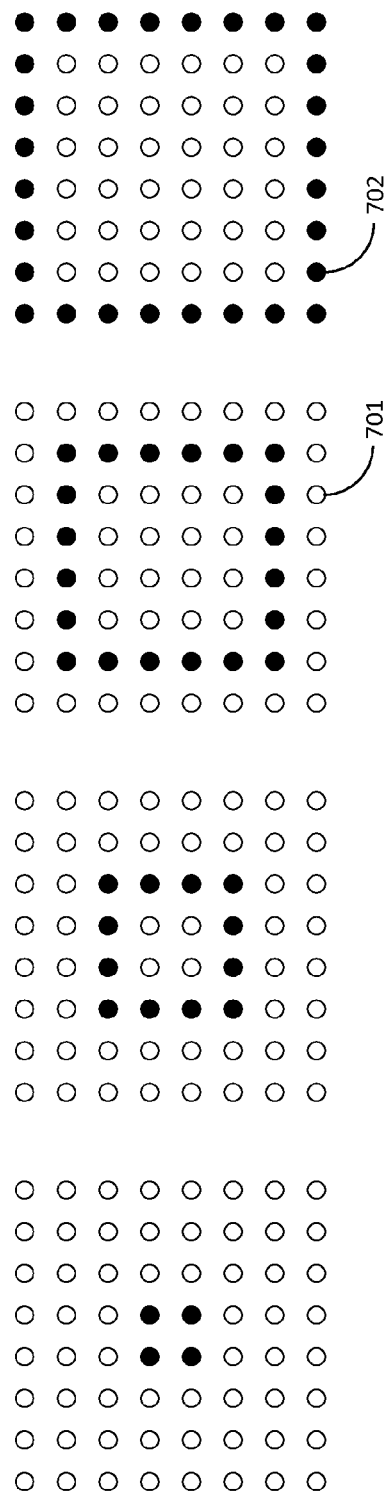
FIG. 7B illustrates a conceptual representing at four time intervals showing growth of an object over time consistent with embodiments of the present disclosure.

FIG. 7B illustrates a shape growing in size over time. An empty circle (e.g., point 701) represents a possible stimulation point and the filled circle (e.g., point 702) represents a point of current stimulation. Time progresses from the left to right. In this example, a small square appears in the center of the stimulation field and grows increasingly large in all directions equally and simultaneously. This process may be repeated or it may be reversed. The growth of any shape may be accomplished in a similar manner. Shapes need not always grow symmetrically. This growth may also be combined with a movement of the shape and the addition or subtraction of other components of the tactile image as well. According to one embodiment, a solid square having a perimeter as shown in the left-most frame may be simulated by increasing the speed with which a system transitions between the frames.

Surface topography may be represented as an array of stimulation points at various intensities. Sensation intensity may be represented as the height of this pin at a specified point on the tissue. In recreating the topography of a surface, one method is to adjust the relative intensity of each stimulating beam to represent the relative height of such pins representing the height of the object at that point.

Figure 8:
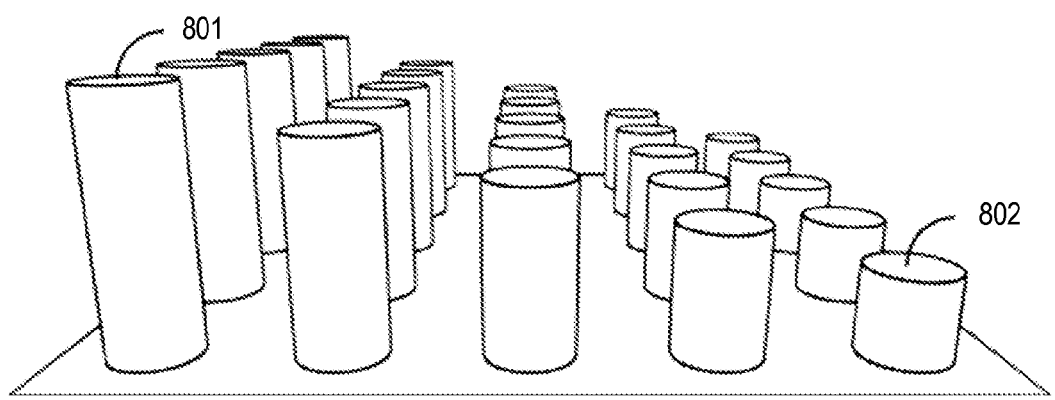
FIG. 8 illustrates a conceptual representation of an array of stimulation points having different intensity to provide information regarding a topography of an object consistent with embodiments of the present disclosure.

FIG. 8 illustrates a representation of a wedge shape where the individual pins represent the location of stimulating beams directed at the user's tissue. The relative height of the beam indicates the relative intensity of the stimulation and the resultant relative intensity of sensation. In FIG. 8, the pins aligned with pin 801 is an example of the high side of the wedge, which a user may experience as pressing more firmly and more deeply into the tissue in comparison to pins aligned with pin 802, which represent a low side of the wedge. This technique may be expanded to create a variety of surface topographies. In various embodiments, the spacing of the beams may be regular or irregular.

Figure 9:
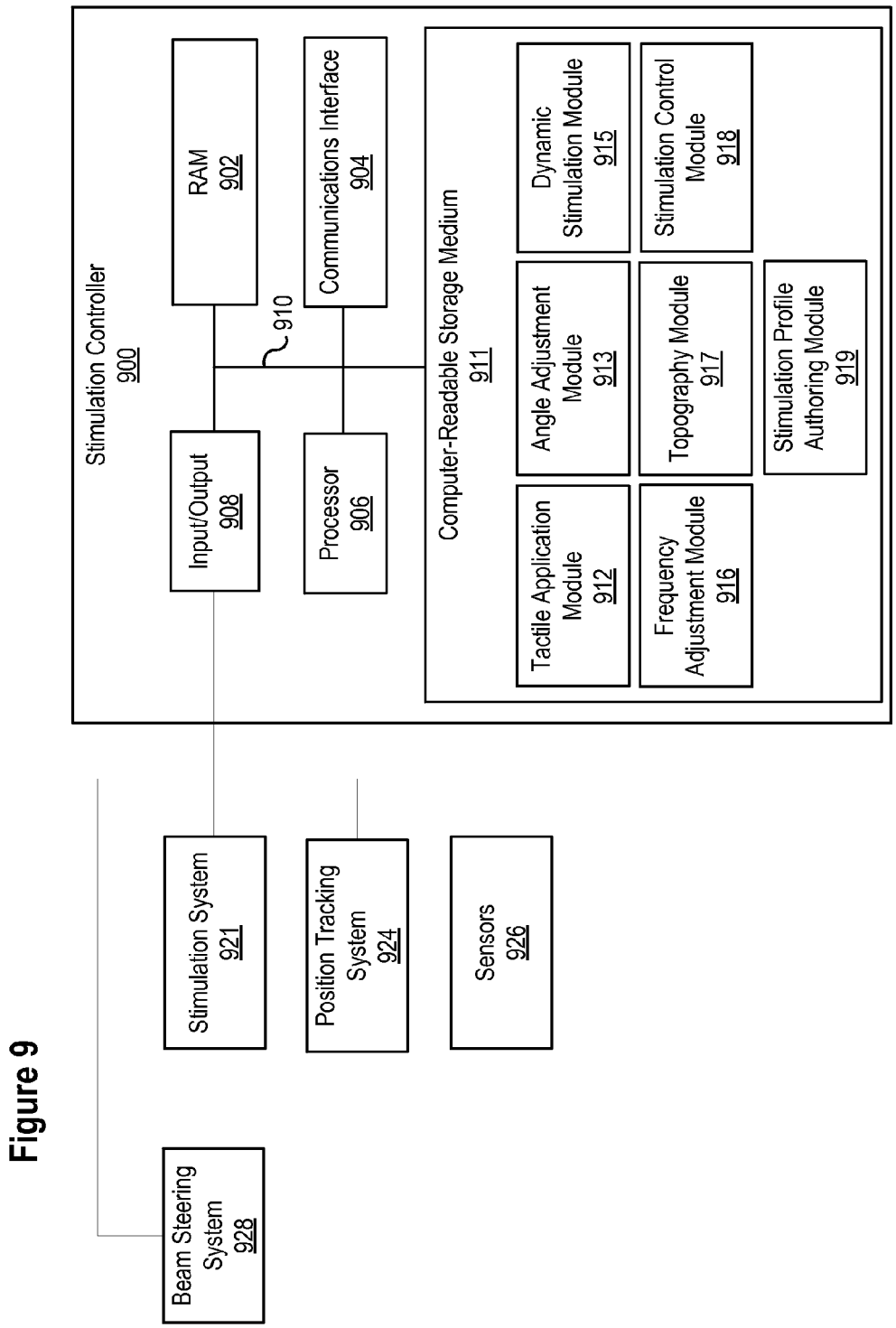
FIG. 9 illustrates a functional block diagram of a system for using optical stimulation consistent with embodiments of the present disclosure.

FIG. 9 illustrates a functional block diagram of a system level design for an electromagnetic radiation system to induce cutaneous sensations. A stimulation controller 900 may provide laser parameter data, including, but not limited to, amplitude, pulse width, frequency, duty cycle, and wave form, to a stimulation system 921. The stimulation controller may acquire input data from, but not limited to, surface tissue temperature, contact surface temperature, ambient temperature, calibration data, previous exposure history, and programmed tactile effect. These input data may be used by the stimulation controller for determining the appropriate laser parameters. An output of the stimulation system 921 may be delivered to a beam steering system 928. According to various embodiments, beam steering system 928 may be embodied using a fixed array of electromagnetic radiation sources such as VCSEL, edge emitters, or LEDs that may or may not be embedded as part of the visual display 921. The output of the stimulation system 921 may be controlled by stimulation controller 900 according to a stimulation profile. According to various embodiments, the stimulation profile may correspond to, but are not limited to, a geometric shape, a topography of a simulated object, a feedback indicator, and the like.

Beam steering system 928 may be embodied using a variety of devices, including, but not limited to, a dual-axis galvanometer-based scanner, dynamically controlled stacked polarization gratings, MEMS-based laser scanning mirror, a digital micromirror devices, acousto-optic beam deflector, liquid crystal spatial light modulator, and the like. Beam steering system 928 may direct the beam through a stimulation touch surface, or in some embodiments, directly to a stimulation area on a user's skin. Information regarding beam positioning and/or scanning speed may be collected by beam steering system 928 for use in a closed loop control system.

Returning to a discussion of FIG. 9, a position tracking system 924 may be configured to track the position of tissue being stimulated or tissue to be stimulated. Position tracking system 924 may be configured to operate in connection with both contact surface stimulation embodiments and free-space (i.e., non-contact) stimulation embodiments. In one specific example, a contact surface stimulation embodiment may comprise a touch screen display. According to this embodiment, a touch screen digitizer may be used to track the position of a user's finger on the display. According to another embodiment, a non-contact stimulation embodiment may utilize a system to track the position of a user's hand in free space using, but not limited to, depth cameras and IR sensors and CCDs, to direct the output of the stimulation system 921 to the location determined by the position tracking system 924.

A plurality of sensors 926 may further be coupled to stimulation controller 900. A variety of types of sensors 926 may provide inputs and/or feedback to stimulation controller 900. For example, thermal feedback may be provided by a temperature sensing instrument, which may be embodied using a variety of devices, including but not limited to, a thermocouple, thermographic imager, pyrometric detector. In another example, sensors 926 may include a perfusion sensor configured to monitor the flow of blood through tissue being stimulated. In this embodiment, input of the perfusion sensor may be used to estimate the amount of heat removal due to blood perfusion. Moreover, a blood flow sensor and a thermal sensor may be used to determine or estimate thermal conduction and/or heat capacity of stimulated tissue, according to one embodiment.

Stimulation controller 900 may be configured to interface with stimulation system 921, position tracking system 924, and/or sensors 926 via input/output system 908. Input/output system 908 may be embodied using a variety of technologies, including wired interfaces (e.g., Universal Serial Bus, IEEE 1394, etc.) or wireless interfaces (e.g., Bluetooth®, 802.11 wireless protocols, etc.).

Stimulation controller 900 may include a processor 906, which may be configured to execute instructions operable to implement the functionality and methods disclosed herein. Processor 906 may operate using any number of processing rates and architectures. Processor 906 may be embodied as a general purpose integrated circuit, an application specific integrated circuit, a field-programmable gate array, and/or any other suitable programmable logic device. Processor 906 may be in communication with random access memory 902 (RAM), where executable instruction may be temporarily stored.

Stimulation controller 900 may also include communications interface 904 configured to communicate with other devices. In certain embodiments, the communications interface 904 may facilitate direct communication with another device or communicate with another device or multiple devices over a communications network. According to some embodiments, communications interface 904 may be embodied as an Ethernet port.

A bus 910 may provide communication among RAM 902, communications interface 904, processor 906, input/output ports 908, and a non-volatile computer-readable storage medium 911. Computer-readable storage medium 911 may be the repository of various software modules configured to perform any of the methods described herein. A stimulation control module 918 may be configured to coordinate the operation of the plurality modules, whose specific functions are described below, and to generate a stimulation profile.

Stimulation profile authoring module 919 may allow access to a library of predefined stimulation profiles. For example, a programmer may intend to convey to the end user the physical sensation of touching a key. The shape and the physical dimensions of the key may be inputs to the stimulation profile authoring module 919. The stimulation profile authoring module 919 may translate the desired physical shape into a stimulation profile to feed to a stimulation system. Stimulation controller 900 may make adjustments to these parameters based on, but not limited to, tissue temperature, movement speed of the tissue of the object, previous stimulation, and other variables in controlling the output of stimulation system 921. Stimulation profile authoring module 919 may allow access to individual stimulation parameters. In some embodiments, stimulation profile authoring module 919 may check to make sure that the stimulation profile does not exceed specified thresholds for energy deposition and energy deposition rates. In another embodiment, stimulation profile authoring module 919 may allow the combination or blending of the one or more predesigned library of sensations. In one embodiment, stimulation profile authoring module 919 may accept graphic or CAD files created by a user. Using CAD files, stimulation profile authoring module 919 may translate the desired shapes into appropriate stimulation profiles, including, but not limited to, stimulation spacing, amplitude, pulse width, frequency, sweep speed, waveform, area, duty cycle, depth or intensity of sensation; all to be delivered to the tissue of the end user.

A tactile application module 912 may be configured to interact with any number of programs and/or devices and to coordinate operation of the stimulation controller 900 with such programs and/or devices. According to various embodiments, the tactile applications may include, but are not limited to, telepresence medicine, compact electronic Braille displays, virtual product online shopping, representing simulated and physical objects and drawings in computer generated images and computer aided drafting (CAD), for touch screen feedback, control feedback, and/or entertainment and gaming devices.

An angle adjustment module 913 may be configured to modify a stimulation profile to account for variation in a sensation that may be attributable to areas having a curvature or a corner. As discussed above, the greater proximity of stimulation points in an area of curvature may cause the sensation to become more intense if the energy imparted at each point of stimulation remains constant. In one embodiment, the angle adjustment module 913 may be configured to operate in a manner consistent with the embodiments illustrated in FIGS. 2A-2D and described in detail herein.

Returning to a discussion of FIG. 9, a dynamic stimulation module 915 may be configured to generate a dynamic stimulation corresponding to a simulated object. A dynamic stimulation may refer to a stimulation profile that changes through time and represents a simulated object. Such dynamic changes in stimulation may be accomplished in any number of ways. FIGS. 5A and 5B provide examples of some dynamic stimulations, which may be implemented by dynamic stimulation module 915 according to certain embodiments.

Returning to a discussion of FIG. 9, frequency adjustment module 916 may be configured to achieve a steady frequency of stimulation of each of a plurality of points in a moving array of stimuli. The frequency of intermittent stimulation at a single point affects the total energy delivered and the intensity of the sensation. Accordingly, frequency adjustment module 916 may be configured to adjust an order in which a plurality of stimulation points to create a uniform frequency of stimulation. FIG. 3 provides an example of a modification of a stimulation protocol to create a uniform frequency of stimulation that may be implemented, according to certain embodiments, by frequency adjustment module 916.

Topography module 917 may be configured to alter the output of stimulation system 921 to create a representation of a topography of a simulated object. According to one embodiment, topography module 917 may be configured to adjust the relative intensity of each of a plurality of stimulating beam to represent the object at that point. According to various embodiments, a combination of sensations may be combined to convey information about the topography of an object, such as height, smoothness or roughness, sharpness or dullness, hardness or softness, and the like.

FIG. 10A illustrates a conceptual representation of a system configured to create variable cutaneous sensations associated with stationary tissue consistent with embodiments of the present disclosure. As illustrated, a single plane of the scenario of a variable surface being delivered through a transmissive surface 1032 to a finger 1031. 1033 represent the individual beams of illumination. A stimulation profile 1034 represents the varying intensities of each of the beams.

FIG. 10B illustrates that over time, the stimulation profile 1034 shown in FIG. 10A and representing a topography of a simulated object, changes beneath the finger. In the illustrated example, the varying stimulation profiles are arranged from top to bottom. The topography of the simulated surface progresses from a variable, or rough, surface to a smooth surface with an abrupt edge. A variety of surface topographies could be represented within the bounds of intensities available. Other parameters that can be adjusted to represent surface topography include, but are not limited to, pulse width, amplitude, frequency, duty cycle, spot size, spot spacing, and wave form.

FIG. 11A illustrates a conceptual representation of a system configured to create a cutaneous sensation by varying a stimulation amplitude at a fixed location while a finger 1101 moves across the fixed location consistent with embodiments of the present disclosure. A system configured to stimulate moving tissue may monitor the position, acceleration, and speed of the tissue (e.g., finger 1101) in relation to the simulated object. When the finger 1101 is positioned away from the simulated object the system may provide no stimulation. When the finger 1101 is placed over any portion of the field of the simulated object, the appropriate amount of stimulation may be imparted. FIG. 11A represents a single point of stimulation 1102 maintained in a stationary place while a finger 1101 moves across it. The acceleration and speed at which the finger moves may be variables based on which the stimulation system determines an amount of energy to impart to the tissue to create a given intensity of sensation and to minimize sensation onset.

FIGS. 11B-11D illustrate three stimulation profiles that may represent a topography of a simulated object based on acceleration and speed of the finger 1101 as it moves across the point of stimulation 1102. In FIG. 11B, the finger 1101 is moving relatively quickly. Accordingly, each stimulation pulse of stimulation profile 1106 is separated by a relatively large distance. In other words, each time the finger is stimulated, because of the relatively high speed, a new portion of the finger is stimulated which has been previously unstimulated. The stimulation profile 1106 may have a relatively high amplitude 1104, and thus may be able to provide sufficient energy to meet and exceed a sensation threshold 1105. The sensation threshold 1105 represents the minimum energy level necessary to maintain sensation on a portion of the finger which is stationary and has, therefore, been irradiated previously to the point of sensation.

FIG. 11C, illustrates a situation in which the finger 1101 is moving more slowly than in FIG. 11B, and accordingly, the stimulation profile 1107 has a lower amplitude in comparison to FIG. 11B. The amplitude illustrated in FIG. 11B exceeds the sensation threshold 1105 but is lower than that necessary for previously unilluminated tissue. As discussed above, previously stimulated tissue may heat surrounding tissue and make such tissue more receptive to stimulation.

FIG. 11D illustrates a situation in which the FIG. 1101 is moving more slowly than in FIG. 11C, and accordingly, the stimulation profile 1108 has a lower amplitude in comparison to FIG. 11C. The amplitude illustrated in FIG. 11C is approximately equal to the sensation threshold 1105. Again, as discussed above, because of the heating associated with stimulation of the tissue and adjacent regions during period of stimulation, the reduced energy may be sufficient to elicit a sensation that is approximately equal to the sensations imparted as a result of a stimulation profile.

FIGS. 11E-11G further illustrate that an amplitude of a stimulation profile may vary as a result of a topography of a simulated object. In FIGS. 11E-11G, simulated object is a stationary simulated plateau, represented by reference no 1123. The simulated object may be created by illumination of the finger 1121 with multiple light beams 1124 at variable energies 1125 only when the finger 1121 is within the field 1126 of the simulated object. The finger 1121 is moving sequentially from left to right at a constant speed. FIG. 11E illustrates the finger 1121 initially encountering the edge of the plateau. When the finger enters the field 1126 of the simulated plateau, it may initially encounter the edge of the plateau. The stimulation system may create the sensation of an abrupt edge and a constant height of the simulated object by illuminating the finger 1121 at a higher level than would be necessary for maintenance of sensation of previously stimulated tissue. Only the portion of the finger that is both contacting the surface and in the field of the simulated object is illuminated.

FIG. 11F illustrates that as time progresses, the energy level of stimulation may drop to the minimum necessary for maintenance of the sensation at the level of the plateau. In the middle panel, the finger is entirely within the field of the plateau, yet remains in motion. The entire contact area of the finger may be illuminated at the maintenance level of the plateau.

FIG. 11G illustrates the stimulation profile as the finger exits the field 1126 and passes from the top of the simulated plateau to the opposite edge of the simulated plateau. Only the portion of the finger remaining in the plateau area may continue to be stimulated. There may also be edge effects for the trailing edge as the finger leaves the plateau area which makes for a more distinct edge felt tactilely.

The example illustrated in FIGS. 11E-11G in which the finger 1121 moves across a simulated object at a constant speed is only one of several possible cases. There are times when the user will begin to move more quickly or more slowly over an edge or the body of such a simulated object. According to various embodiments consistent with the present disclosure, a controller of a stimulation system may compensate for the speed of movement and acceleration by changing the amount of energy imparted to the finger. For example, in the case of increased speed starting in the middle of an object larger than the finger pad, sustained sensation may require no change in energy delivery, but the position of delivery may move more quickly to match the finger position. In the case of increased speed on the initial edge of encounter with an object, the energy delivered may need to increase and would do so in proportion to the speed as it would be necessary to bring on sensation to new portions of the finger pad more quickly.

Figures 12A, 12B:
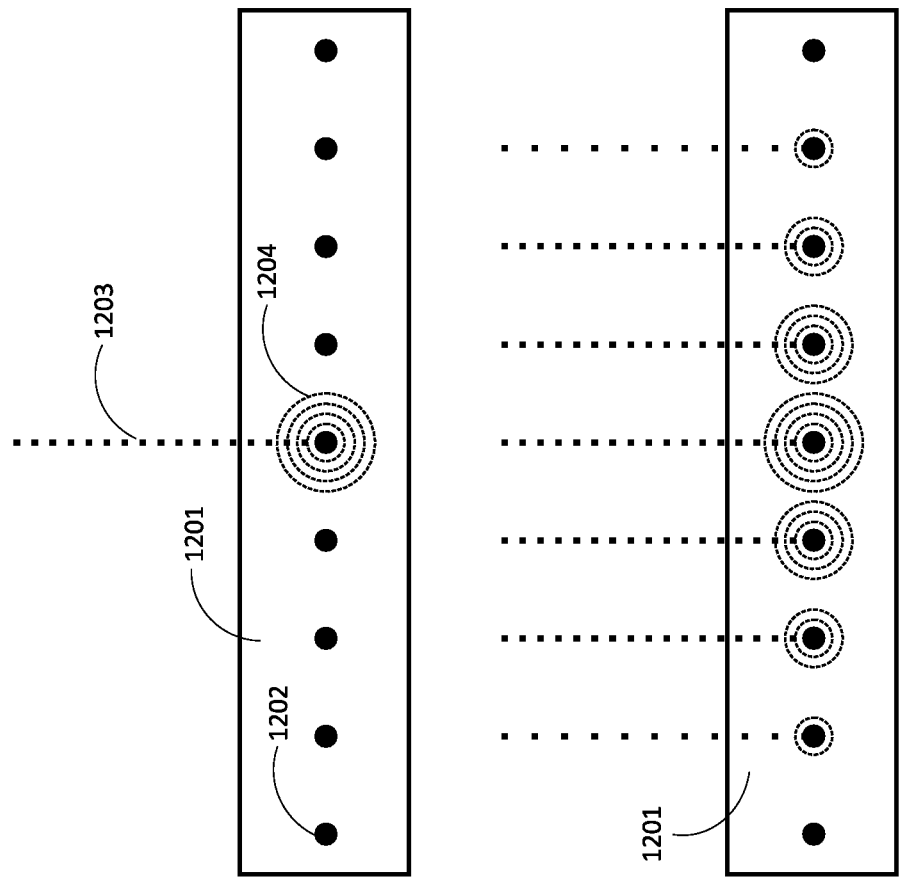
FIG. 12A illustrates a representation of a sharp sensation consistent with embodiments of the present disclosure.
FIG. 12B illustrates a representation of a dull sensation consistent with embodiments of the present disclosure.

FIG. 12A illustrates a representation of sharp sensation consistent with embodiments of the present disclosure, while FIG. 12B illustrates a dull sensation consistent with embodiments of the present disclosure. In FIGS. 12A and 12B, an area of tissue 1201 may include a plurality of stimulation sites 1202. According to some embodiments the plurality of stimulation sites 1202 may be mechanoreceptor fields or thermal receptive fields.

Mechanoreceptive fields, as the term is used herein, are the basic unit of sensation. In other words, the minimum area of sensation that can be distinguished by sensation uniquely from a similar area adjacent based on mechanical stimuli. This is similar to the concept of two-point discrimination in mechanical testing. The idea is that there is a distance beyond which two points of sensation are distinctly felt and below which two points of stimulation are experienced as one point of sensation. In the case of light induced sensation, a photoreceptive equivalent of a mechanoreceptor field may have a radius of one half the distance from one center of illumination to the next when these two beams are at the minimum distance to produce two points of distinct sensation. Mechanoreceptive fields may have any number of different mechanoreceptor cells and nerve endings contained therein. The distinction of a field is not based on anatomy, rather experimental physiology. The field is sized by sensation produced and not the mechanism. These fields vary in size depending on the location on the skin, much like the two-point discrimination determined by mechanical testing. Certainly the density of physiologic sensors plays a role in this, but it is not determined how many receptors are actually contained in any given mechanoreceptive field for purposes of the present disclosure. FIGS. 12A and 12B illustrate a conceptual photoreceptive equivalent to the mechanoreceptive field.

In FIG. 12A, a light beam 1203 incident on the skin may activate one of the plurality of stimulation sites 1202 corresponding to a mechanoreceptor field to induce the sensation of mechanical activation or a photoreceptive equivalent. An area of stimulation induced by a light beam 1203 may be represented as a series of concentric rings 1204. In the illustrated embodiment, a greater number of rings may indicate a higher activation and thus, a more intense sensation. FIG. 12A shows only a single point of stimulation with high intensity. This stimulation profile may be experienced as a sharp point.

FIG. 12B illustrates stimulation at a plurality of stimulation points, with the most intense stimulation in the center and reduced stimulation moving away from the center. The illustrated stimulation profile may create a graded sensation from the most intense in the center to minimally intense near the edge of the sensation. This stimulation profile may correspond to a sensation of a dull object. Sensations, such as sharp and dull, may be created by the contour of the edges, whether there is a large difference in activation of adjacent mechanoreceptors. Light induced stimulation may provide tight control over the area of sensation. Dramatic changes in sensation intensity can be created in small areas with the ability to create the tactile illusion of a dramatically sharp edge.

Figure 13:
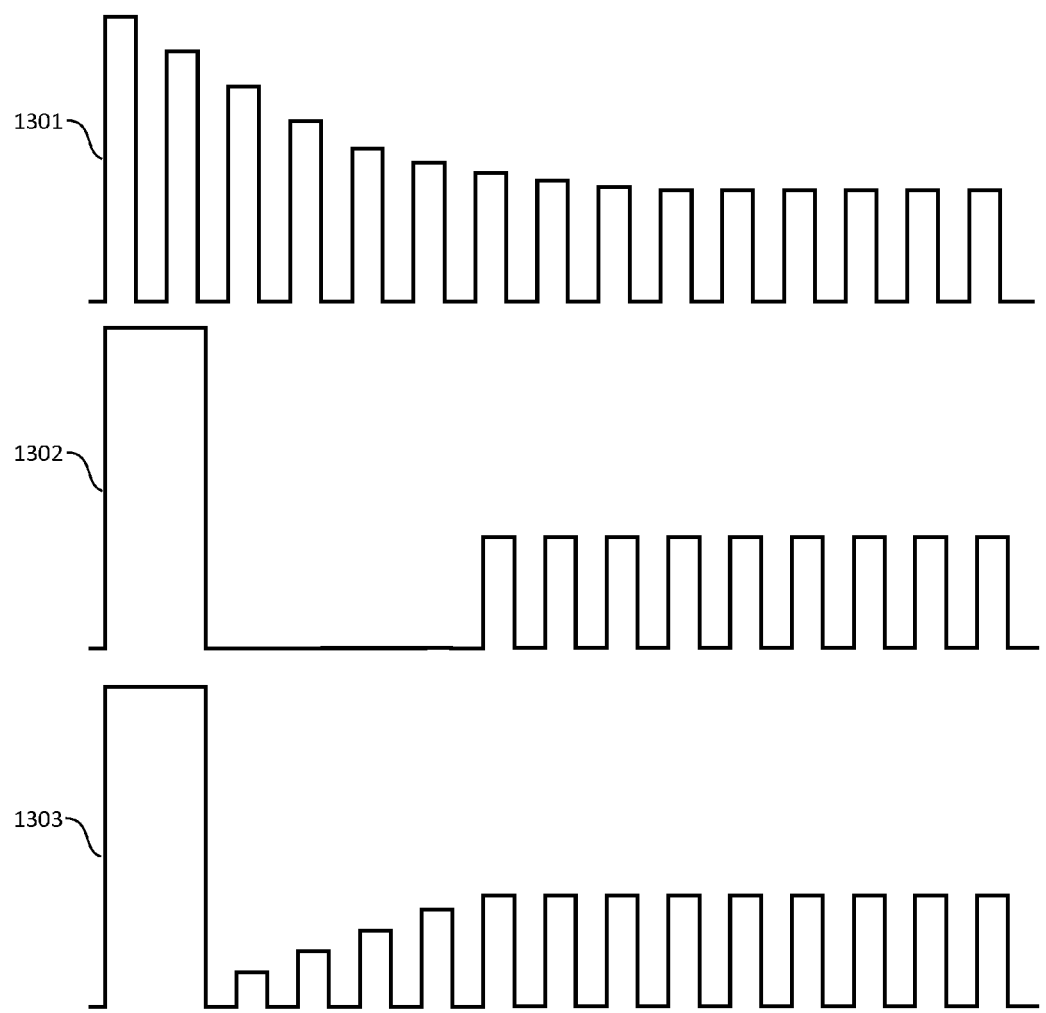
FIG. 13 illustrates various stimulation profiles configured to rapidly induce a sensation and maintain a constant level of sensation over time consistent with embodiments of the present disclosure.

FIG. 13 illustrates various stimulation profiles 1301-1303 that rapidly induce a sensation and maintain a constant level of sensation over time consistent with embodiments of the present disclosure. Onset of a tactile sensation may be dictated by the light tissue interaction and different onset effects can be created. A near immediate onset of sensation may be achieved by a stimulation protocols that impart a high energy to the tissue in a short time. After this onset, if a sustained sensation is desired a number of different protocols can be used. Stimulation profile 1301 illustrates a scenario in which the initial pulses are of sufficiently high energy to quickly elicit sensation but fall off in energy as less energy is required to sustain sensation. Stimulation profile 1302 illustrates a scenario in which a single pulse may elicits sensation and then allows the tissue to rest for a short time before delivering a sustained train of stimulation pulses to maintain a constant sensation. Stimulation profile 1303 illustrates a scenario in which a strong initial pulse is followed by pulses of reduced intensity that reach an equilibrium after a period of time. Stimulation profiles 1301-1303 are only examples of stimulation profiles that may induce rapid onset of a sensation that may be indefinitely maintained.

Figure 14A:
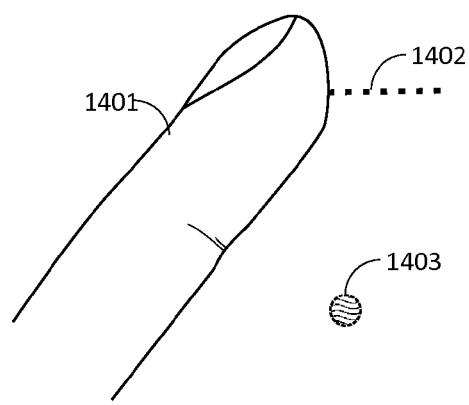
FIG. 14A illustrates an approximately circular pattern created by a stimulating beam when the beam incidence is normal to the tissue consistent with embodiments of the present disclosure.
Figure 14B:
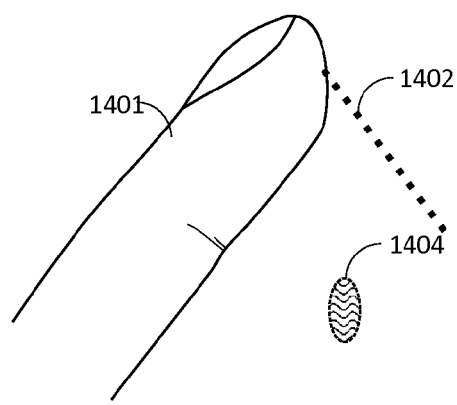
FIG. 14B illustrates an elliptical pattern created by the stimulating beam when the stimulating beam is at a high angle of to the tissue consistent with embodiments of the present disclosure.

FIG. 14A illustrates an approximately circular pattern 1403 created by a stimulating beam 1402 when the beam incidence is normal to the tissue 1401. In contrast, as illustrated in FIG. 14B, an elliptical pattern 1404 is created by the stimulating beam 1402 when the stimulating beam 1402 is at a high angle of incidence to the tissue 1401. When the beam incidence is normal to the tissue, as illustrated in FIG. 14A, the resultant illumination spot is minimized; however, when the angle of incidence increases, so does the size of the illumination spot. This may result in an increased amount of reflection at the surface as well as a decrease in the energy density. A stimulation system may compensate for such changes by increasing or decreasing the energy delivered to the tissue to elicit the desired sensation intensity.

Figure 15A:
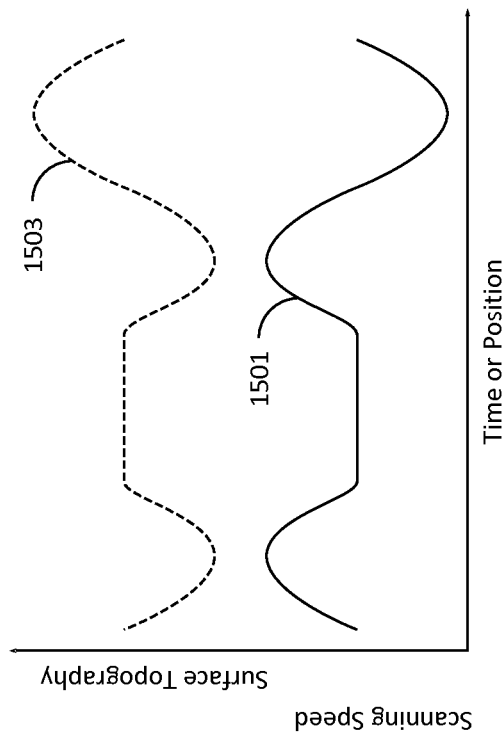
FIG. 15A illustrates a stimulation profile configured to use movement over time to convey information regarding a surface topography consistent with embodiments of the present disclosure.

FIG. 15A illustrates a conceptual representation for delivering stimulation profile 1501 to a user to convey information regarding a surface topography of a simulated object using movement of an stimulation area or a series of stimulation areas generated by an electromagnetic radiation system. The speed in which the spot(s) moves is also perceptible to the user. In one embodiment, the scanning speed in which the illumination spot(s) move relative to the tissue may vary to render the surface topography desired. In one embodiment, the scanning speed of the illumination spot(s) may increase by a calculated amount to represent a raised or "high" point at a certain location along the surface. Conversely, a slower scanning speed may be delivered to the user by some calculated amount for depressions or "low" points. In another possible embodiment the surface topography can be used to represent how the speed of the illumination spot(s) changes with either position or time as shown in FIG. 15A.

Figure 15B:
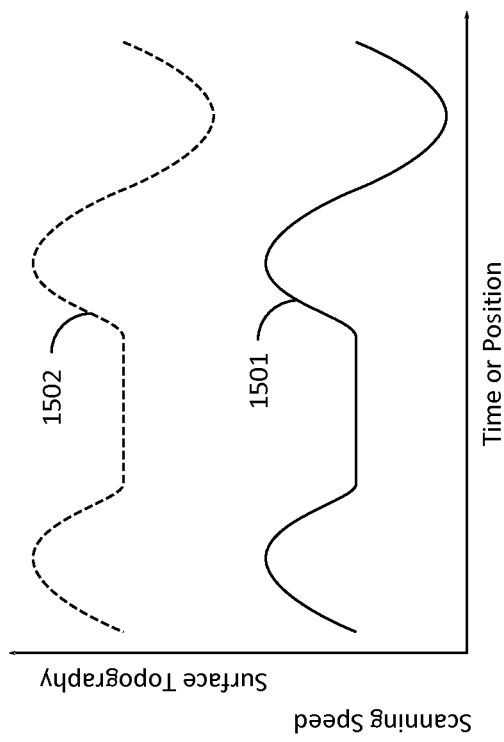
FIG. 15B illustrates that an inverse of the stimulation profile illustrated in FIG. 15A may be used to convey information regarding a surface topography consistent with embodiments of the present disclosure.

FIG. 15B illustrates that an inverse relationship, in comparison to FIG. 15A, between scanning speed of the illumination spot(s) and surface topography may also be used to convey information regarding the topography of a simulated object according to certain embodiments consistent with the present disclosure. In such an embodiment, the raised surface may be represented by slower scanning speeds and the depressions represented by faster scanning speeds as shown by stimulation profile 1503. There may be a minimum scanning speed needed to differentiate it from a static illumination spot(s). Similarly, there may be a maximum scanning speed above which sensations are detected as part of a larger stationary object rather than a smaller moving object. In another embodiment, other parameters including, but not limited to, number of illumination spots, illumination spot/path spacing, amplitude, pulse width, spot size, frequency, duty cycle, and waveform, may also be varied according to the surface topography. Variation of sensation movement may, in certain embodiments, be an inferred representation of topography rather than a true physical depiction.

In addition to variation in the scanning speed of an illumination spot, a variety of other parameters associated with a stimulation system may be modified to provide information regarding a topography or surface of a simulated object to a user. For example, a system may vary the number of illumination spots, illumination spot or path spacing, amplitude, pulse width, spot size, frequency, duty cycle, and waveform to provide information to a user regarding a simulated object.

While specific embodiments and applications of the disclosure have been illustrated and described, the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

The invention claimed is:

1. A system configured to induce a cutaneous sensation in a user of an electronic device based upon a tactile application executable on the electronic device, the system comprising:
   a stimulation system configured to generate an output operable to excite neural tissue;
   an interface component configured to direct the output of the stimulation system onto a target area of skin of the user; and
   a controller configured to generate a control signal to cause the stimulation system to modify one or more characteristics of the output of the stimulation system in order to induce a cutaneous sensation based on:
   a tactile application executable on the electronic device, the tactile application configured to generate a representation of a simulated object, and
   a stimulation profile representing at least one present stimulation area and at least one prior stimulation area, the profile further representing a time associated with a prior stimulation of the prior stimulation area;
   wherein the output of the stimulation system is controlled to elicit a desired sensation in proximity to one of a curve, a corner, and a change in direction to maintain a constant level of stimulation by at least one of: selectively omitting at least one stimulation point and varying an intensity of the output.

2. The system of claim 1, wherein the stimulation system is configured to adjust the stimulation profile to account for thermal conduction of stimulated tissue, heat capacity of stimulated tissue, evaporative cooling, and blood perfusion of stimulated tissue.

3. The system of claim 1, wherein the controller is configured to adjust the profile in proximity to an angled portion of a stimulation profile.

4. The system of claim 3, wherein adjustment of the profile comprises increasing a distance between a plurality of stimulation points in proximity to the angled portion.

5. The system of claim 3, wherein varying the intensity of the output comprises decreasing the intensity of the output in proximity to the angled portion to provide a uniform sensation in proximity to the angled portion.

6. The system of claim 1, wherein the controller is further configured to deliver a plurality of punctate stimuli to a plurality of points in a moving pattern, the moving pattern comprising a first frame and a second frame comprising at least one point in the second frame that is absent from the first frame.

7. The system of claim 6, wherein the controller is further configured to identify a plurality of points in common between the first frame and the second frame in the moving pattern and to maintain stimulation of at least one of the plurality of points in common between the first frame and the second frame.

8. The system of claim 7, wherein the controller is further configured to adjust an order in which the plurality of points are stimulated based on an indication in the stimulation profile of prior stimulation to create a uniform frequency of stimulation at the plurality of points.

9. The system of claim 6, wherein the controller increases the output at a first point stimulated for a first time as a result of a movement of the moving pattern to create a uniform sensation at a point of stimulation in the second frame and absent in the first frame.

10. The system of claim 1, wherein the controller is configured to direct the output through a range of positions at a variable speed.

11. The system of claim 10, wherein the moving pattern represents a topography of the simulated object based on variation of the speed with which the output moves through the range of positions.

12. The system of claim 1, wherein the stimulation profile further represents a topography of the simulated object based on a variation in at least one of a number of illumination spots, a spacing between a plurality of illumination spots, an amplitude, a pulse width, a spot size, a frequency, a duty cycle, and a waveform.

13. The system of claim 1, wherein the stimulation system is configured to emit electromagnetic radiation in one of a visible spectrum and an infrared spectrum.

14. A method for inducing a cutaneous sensation in a user of an electronic device based upon a tactile application executable on the electronic device, the method comprising:
   generating an output of a stimulation system operable to excite neural tissue;
   directing the output of the stimulation system onto a target area of skin of the user;
   generating a representation of a simulated object using a tactile application executable on the electronic device;
   generating a stimulation profile representing at least one present stimulation area and at least one prior stimulation area, the profile further representing a time associated with a prior stimulation of the prior stimulation area;
   modifying one or more characteristics of the output of the stimulation system in order to induce a cutaneous sensation based on the representation of the simulated object and the stimulation profile;

wherein modifying one or more characteristics of the output further comprises adjusting the output of the stimulation system in proximity to one of a curve, a corner, and a change in direction to maintain a constant level of stimulation by at least one of: selectively omitting at least one stimulation point and varying an intensity of the output.

15. The method of claim 14, wherein the stimulation system is configured to adjust the stimulation profile to account for thermal conduction of stimulated tissue, heat capacity of stimulated tissue, evaporative cooling, and blood perfusion of stimulated tissue.

16. The method of claim 14, further comprising adjusting the profile in proximity to an angled portion of a stimulation profile.

17. The method of claim 16, wherein adjusting the profile comprises increasing a distance between a plurality of stimulation points in proximity to the angled portion.

18. The method of claim 16, wherein varying the intensity of the output comprises decreasing the intensity of the output in proximity to the angled portion to provide a uniform sensation in proximity to the angled portion.

19. The method of claim 14, further comprising delivering a plurality of punctate stimuli to a plurality of points in a moving pattern, the moving pattern comprising a first frame and a second frame comprising at least one point in the second frame that is absent from the first frame.

20. The method of claim 19, further comprising:
identifying a plurality of points in common between the first frame and the second frame;
maintaining stimulation of at least one of the plurality of points in common between the first frame and the second frame.

21. The method of claim 20, further comprising adjusting an order in which the plurality of points are stimulated based on an indication in the stimulation profile of prior stimulation to create a uniform frequency of stimulation at the plurality of points.

22. The method of claim 20, further comprising increasing the output at a first point stimulated for a first time as a result of a movement of the moving pattern to create a uniform sensation at a point of stimulation in the second frame and absent in the first frame.

23. The method of claim 14, further comprising representing a topography of the simulated object based on a variation in at least one of a number of illumination spots, a spacing between a plurality of illumination spots, an amplitude, a pulse width, a spot size, a frequency, a duty cycle, and a waveform.

24. The method of claim 14, further comprising operating the stimulation system to produce the output in one of a visible spectrum and an infrared spectrum.

* * * * *